United States Patent
Kanno et al.

(10) Patent No.: US 6,295,560 B1
(45) Date of Patent: Sep. 25, 2001

(54) DATA DELIVERY SYSTEM WITH LOAD DISTRIBUTION AMONG DATA DELIVERY UNITS USING SHARED LOWER ADDRESS AND UNIQUE LOWER LAYER ADDRESS

(75) Inventors: Shinichi Kanno; Shigehiro Asano, both of Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/205,368

(22) Filed: Dec. 4, 1998

(30) Foreign Application Priority Data

Dec. 5, 1997 (JP) .................................................. 9-335184

(51) Int. Cl.$^7$ ...................................................... G06F 13/00
(52) U.S. Cl. ........................................... 709/235; 370/432
(58) Field of Search ..................................... 709/201–203, 709/230–238, 218, 217; 370/390, 392, 401, 432

(56) References Cited

U.S. PATENT DOCUMENTS

| | | | |
|---|---|---|---|
| 5,825,772 | * 10/1998 | Dobbins et al. | 370/396 |
| 5,978,373 | * 11/1999 | Hoff et al. | 370/392 |
| 5,982,775 | * 11/1999 | Brunner et al. | 370/401 |
| 5,999,530 | * 12/1999 | LeMaire et al. | 370/390 |
| 6,006,256 | * 12/1999 | Zdepski et al. | 709/217 |
| 6,018,766 | * 1/2000 | Samuel et al. | 709/218 |
| 6,091,732 | * 7/2000 | Alexander, Jr. et al. | 370/401 |
| 6,144,673 | * 11/2000 | Korus | 370/432 |
| 6,147,995 | * 11/2000 | Dobbins et al. | 370/392 |

OTHER PUBLICATIONS

Y. Wang, et al., "Web Server Clustering with Single–I/P Image: Design and Implementation", http://akpublic.research.att.com/~ymwang/papers/HTML/ONE–IP/S.html, Nov. 1, 1997.

Convoy Cluster Software, "Overview of Clustering with Convoy", http://www.valence.com/convoy/clustering.html, Nov. 17, 1997.

Convoy Cluster Software, "Theory of Operation", http://www.valence.com/convoy/help/convoyTheroy_of_Operation.html, Nov. 14, 1997.

* cited by examiner

Primary Examiner—David Wiley
(74) Attorney, Agent, or Firm—Oblon, Spivak, McClelland, Maier & Neustadt, P.C.

(57) ABSTRACT

A data delivery system capable of distributing processing loads on the data supply side without providing the control processor, in which clients can receive data delivery without becoming conscious of the switching of processors that carry out the data delivery, is disclosed. In this data delivery system, a request from the client to the data delivery system is always received by all the data delivery units according to the shared lower layer address, while a response to the connection request is made by only one data delivery unit which has the response right at that moment using the unique lower layer address of that data delivery unit. In this way, it appears to the client as if the request is always made with respect to the same correspondent, while at the data supply side, the data delivery unit for responding to the client is appropriately switched by appropriately transferring the response right so as to realize the load distribution within the data delivery system.

19 Claims, 6 Drawing Sheets

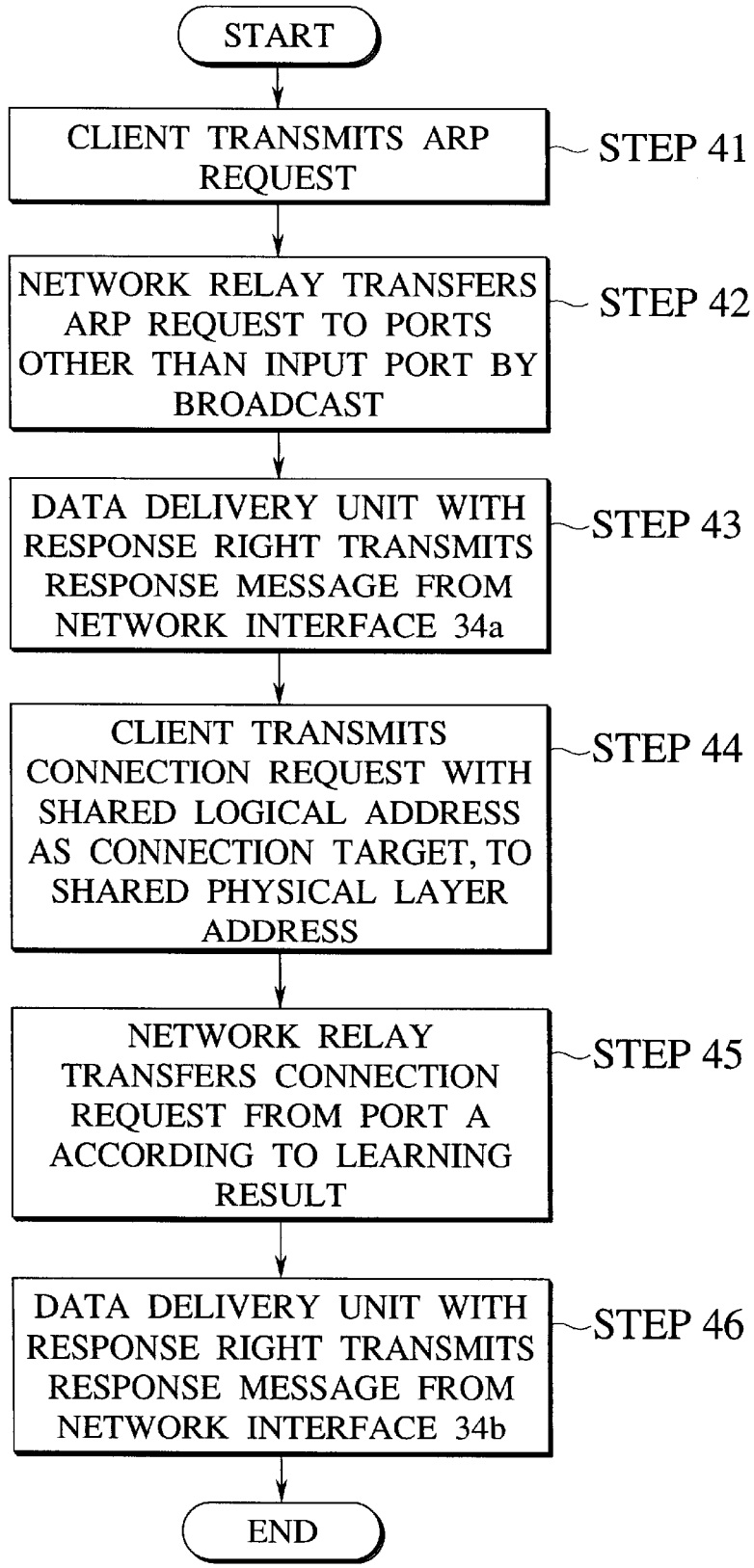

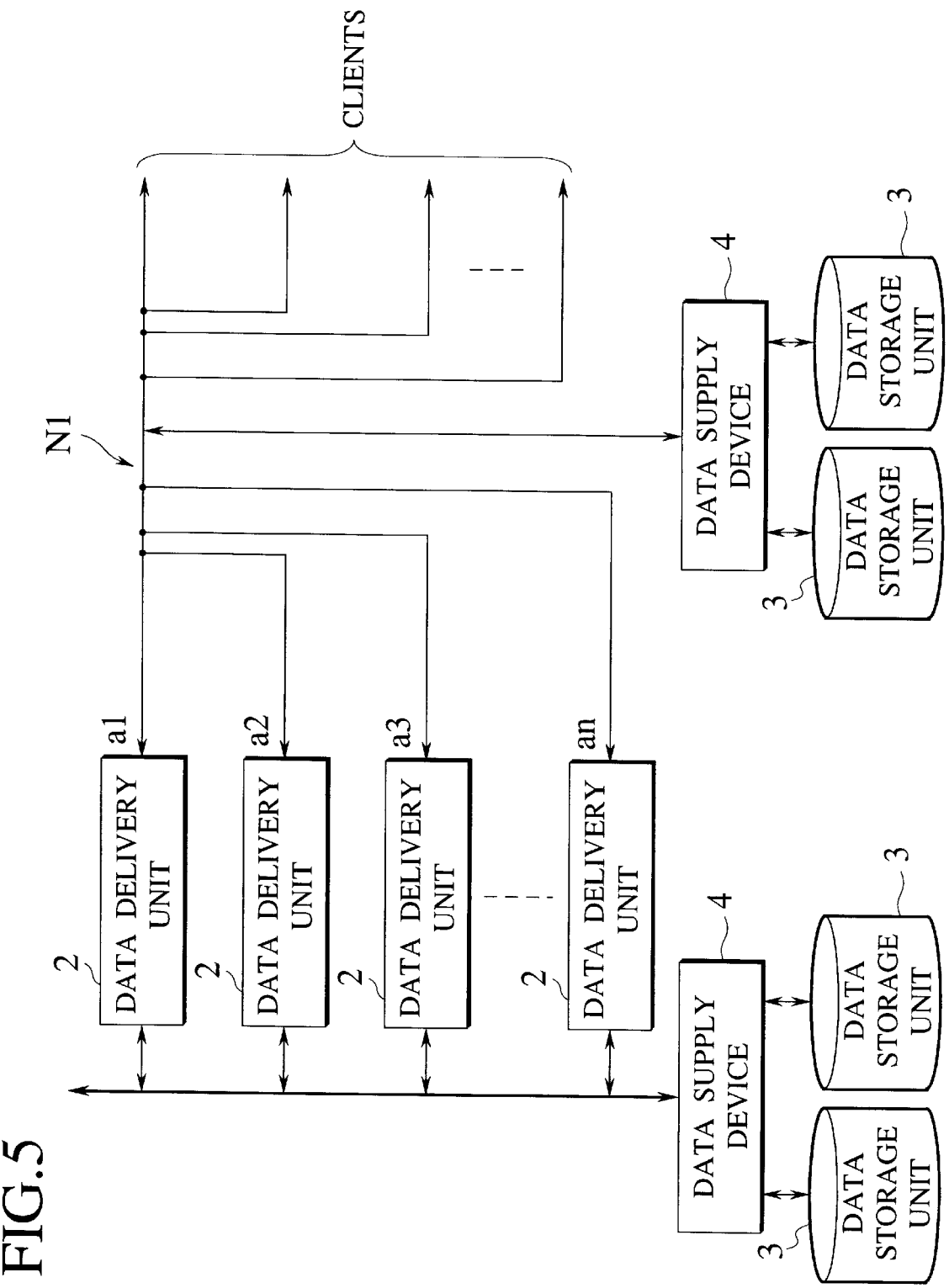

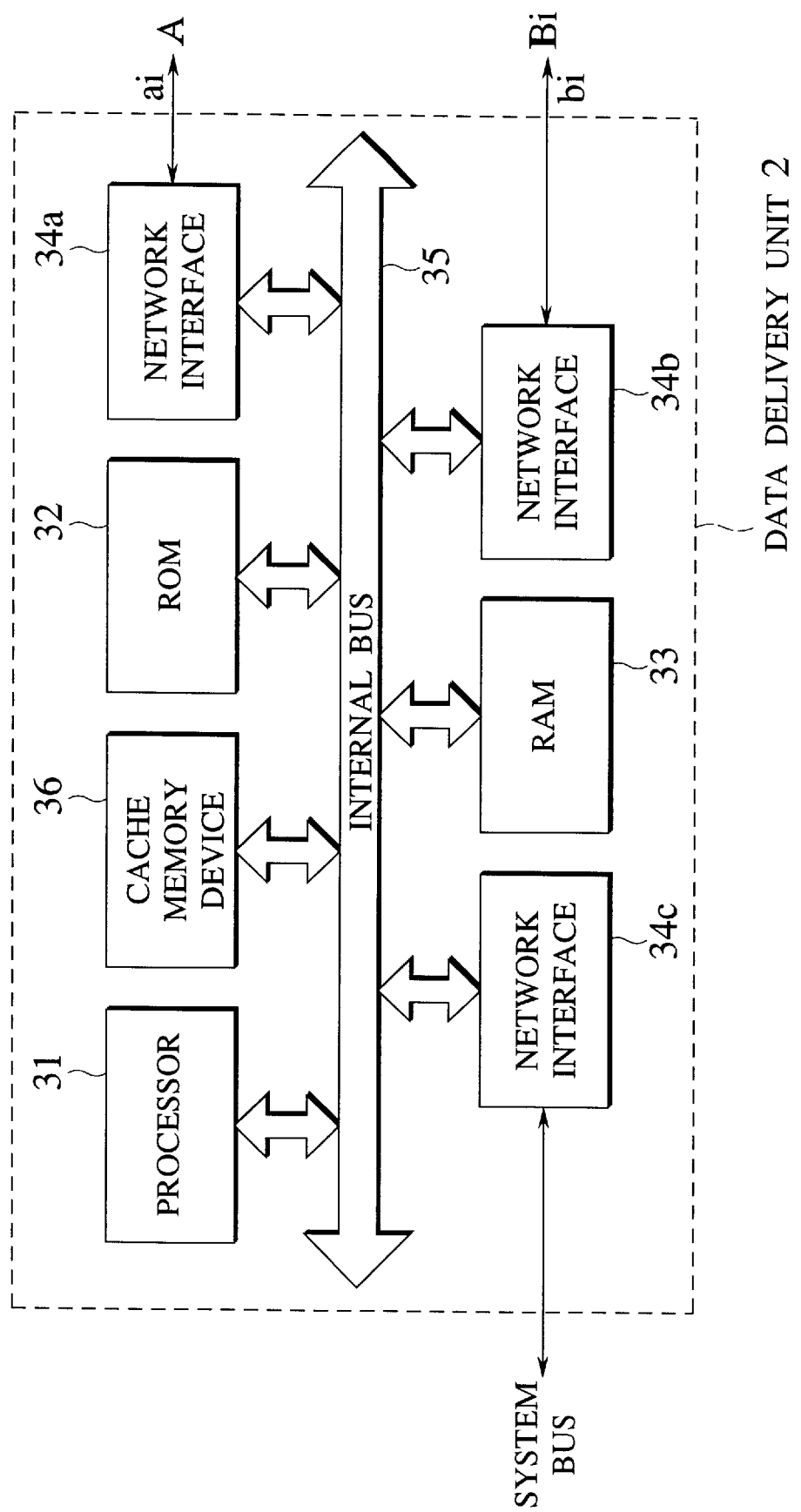

DATA DELIVERY SYSTEM WITH LOAD DISTRIBUTION AMONG DATA DELIVERY UNITS USING SHARED LOWER ADDRESS AND UNIQUE LOWER LAYER ADDRESS

BACKGROUND OF THE INVENTION

1. Field of the Invention

The present invention relates to a data delivery system in which a plurality of data delivery units cooperate to deliver data to clients.

2. Description of the Background Art

In keeping with the development of networks and the improved performance of hardwares in recent years, data to be handled are also increasing in capacity. In particular, the spread of multimedia data in which speech, video, text, etc., are handled collectively is pushing this trend of increasing capacity of data. For this reason, as a technique for transmitting, receiving and processing a large amount of data at high speed, there is a need for a data supply device capable of storing a large amount of data efficiently and providing data in response to various requests quickly.

One such data supply device is a connection-oriented data delivery system formed by a plurality of processors connected through a network. In this system, the conventionally adopted scheme for determining a processor to carry out the data delivery includes the following.

(1) Provide a control processor for determining a processor to carry out the data delivery.

(2) Fixedly determine a processor to carry out the data delivery according to a state of connection to the network, etc.

However, in the former scheme for providing the control processor, there is a problem that the entire data delivery system will stop and the subsequent data supply becomes impossible when that control processor is disabled. Also, in the latter scheme for determining fixedly, there is a problem that the processor resources cannot be utilized effectively when the processing loads concentrate on a specific processor, because it is impossible to re-distribute the processing loads to the other less loaded processors.

SUMMARY OF THE INVENTION

It is therefore an object of the present invention to provide a data delivery system capable of distributing processing loads on the data supply side without providing the control processor, in which clients can receive data delivery without becoming conscious of the switching of processors that carry out the data delivery.

According to one aspect of the present invention there is provided a data delivery system for delivering data to clients, the system having an upper layer address allocated thereto and comprising: a plurality of data delivery units, each having a shared lower layer address common to said plurality of data delivery units and a unique lower layer address uniquely allocated to each data delivery unit; and a transfer unit for transferring a request destined to the upper layer address and transmitted from a client to said plurality of data delivery units and transferring a response destined to the client and transmitted from one of said plurality of data delivery units toward the client; wherein each data delivery unit includes a reception unit for receiving a request from the client that is transferred to the shared lower layer address, and a transmission unit for transmitting a response which has the upper layer address as a source by using own unique lower layer address when a request received by the reception unit is a connection request that is made prior to data delivery and said each data delivery unit has a response right indicating one of said plurality of data delivery units which is allowed to respond to requests.

According to another aspect of the present invention there is provided a method for delivering data to clients from a system formed by a plurality of data delivery units, comprising the steps of: allocating a common upper layer address to said plurality of data delivery units; allocating to each data delivery unit a shared lower layer address common to said plurality of data delivery units and a unique lower layer address to be uniquely allocated to each data delivery unit; transferring a request destined to the upper layer address and transmitted from a client to said plurality of data delivery units; receiving at each data delivery unit a request from the client that is transferred to the shared lower layer address; transmitting from one data delivery unit which has a response right indicating one of said plurality of data delivery units which is allowed to respond to a request, a response which has the upper layer address as a source by using own unique lower layer address when a request received by the receiving step is a connection request that is made prior to data delivery; and transferring a response destined to the client and transmitted from one of said plurality of data delivery units toward the client.

According to another aspect of the present invention there is provided a data delivery device among a plurality of data delivery devices for delivering data to clients in cooperation, comprising: a memory for storing an upper layer address which is commonly allocated to said plurality of data delivery devices: a first interface for holding a shared lower layer address commonly allocated to said plurality of data delivery devices, receiving a request destined to the upper layer address and transmitted from a client, and transmitting a response which has the upper layer address as a source by using the shared lower layer address when a received request is an address resolution request; and a second interface for holding a unique lower layer address uniquely allocated to said data delivery device among said plurality of data delivery devices, and transmitting a response which has the upper layer address as a source by using own unique lower layer address when a received request is a connection request that is made prior to data delivery and said data delivery device has a response right indicating one of said plurality of data delivery devices which is allowed to respond to requests.

According to another aspect of the present invention there is provided an article of manufacture, comprising: a computer usable medium having computer readable program code means embodied therein for causing a computer to function as a data delivery device among a plurality of data delivery devices for delivering data to clients in cooperation, the computer readable program code means includes: first computer readable program code means for causing said computer to store an upper layer address which is commonly allocated to said plurality of data delivery devices: second computer readable program code means for causing said computer to hold a shared lower layer address commonly allocated to said plurality of data delivery devices, receive a request destined to the upper layer address and transmitted from a client, and transmit a response which has the upper layer address as a source by using the shared lower layer address when a received request is an address resolution request; and third computer readable program code means for causing said computer to hold a unique lower layer address uniquely allocated to said data delivery device among said plurality of data delivery devices, and transmit a response which has the upper layer address as a source by using own unique lower layer address when a received request is a connection request that is made prior to data delivery and said data delivery device has a response right indicating one of said plurality of data delivery devices which is allowed to respond to requests.

According to another aspect of the present invention there is provided a data delivery system for delivering data to clients, comprising: a plurality of data delivery units, in which requests transmitted from a client including a connection request and a data delivery request are received by every data delivery unit and responses to requests are transmitted from one of said plurality of data delivery units toward the client, each data delivery unit including: a transmission unit capable of transmitting a first response to the connection request and a second response containing data requested by the data delivery request; and a processor for determining one data delivery unit which should transmit the second response among said plurality of data delivery units and commanding said one data delivery unit to transmit the second response, in a case where the transmission unit of said each data delivery unit transmitted the first response.

According to another aspect of the present invention there is provided a method for delivering data to clients from a system formed by a plurality of data delivery units, the method comprising the steps of: receiving requests transmitted from a client including a connection request and a data delivery request by every data delivery unit; transmitting responses to requests from one of said plurality of data delivery units toward the client, where each data delivery unit is capable of transmitting a first response to the connection request and a second response containing data requested by the data delivery request; and determining one data delivery unit which should transmit the second response among said plurality of data delivery units and commanding said one data delivery unit to transmit the second response, at each data delivery unit which transmitted the first response.

According to another aspect of the present invention there is provided a data delivery device among a plurality of data delivery devices for delivering data to clients in cooperation, comprising: a reception unit for receiving requests transmitted from a client including a connection request and a data delivery request which are to be received by every data delivery devices; a transmission unit capable of transmitting a first response to the connection request and a second response containing data requested by the data delivery request, where responses to requests are to be transmitted from one of said plurality of data delivery devices toward the client; and a processor for determining one data delivery device which should transmit the second response among said plurality of data delivery devices and commanding said one data delivery unit to transmit the second response, when the transmission unit of said data delivery device transmitted the first response.

According to another aspect of the present invention there is provided an article of manufacture, comprising: a computer usable medium having computer readable program code means embodied therein for causing a computer to function as a data delivery device among a plurality of data delivery devices for delivering data to clients in cooperation, the computer readable program code means includes: first computer readable program code means for causing said computer to receive requests transmitted from a client including a connection request and a data delivery request which are to be received by every data delivery devices; second computer readable program code means for causing said computer to function as a transmission unit of said data delivery device which is capable of transmitting a first response to the connection request and a second response containing data requested by the data delivery request, where responses to requests are to be transmitted from one of said plurality of data delivery devices toward the client; and third computer readable program code means for causing said computer to determine one data delivery device which should transmit the second response among said plurality of data delivery devices and command said one data delivery unit to transmit the second response, when the transmission unit of said data delivery device transmitted the first response.

Other features and advantages of the present invention will become apparent from the following description taken in conjunction with the accompanying drawings.

BRIEF DESCRIPTION OF THE DRAWINGS

FIG. 4 is a flow chart of an operation by the data delivery system of FIG. 1.

FIG. 5 is a block diagram showing another exemplary configuration of a data delivery system according to the present invention.

FIG. 6 is a block diagram showing another exemplary configuration of a data delivery unit in the data delivery system of FIG. 1.

DETAILED DESCRIPTION OF THE PREFERRED EMBODIMENTS

Referring now to FIG. 1 to FIG. 6, one embodiment of a data delivery system according to the present invention will be described in detail.

Figure 1:
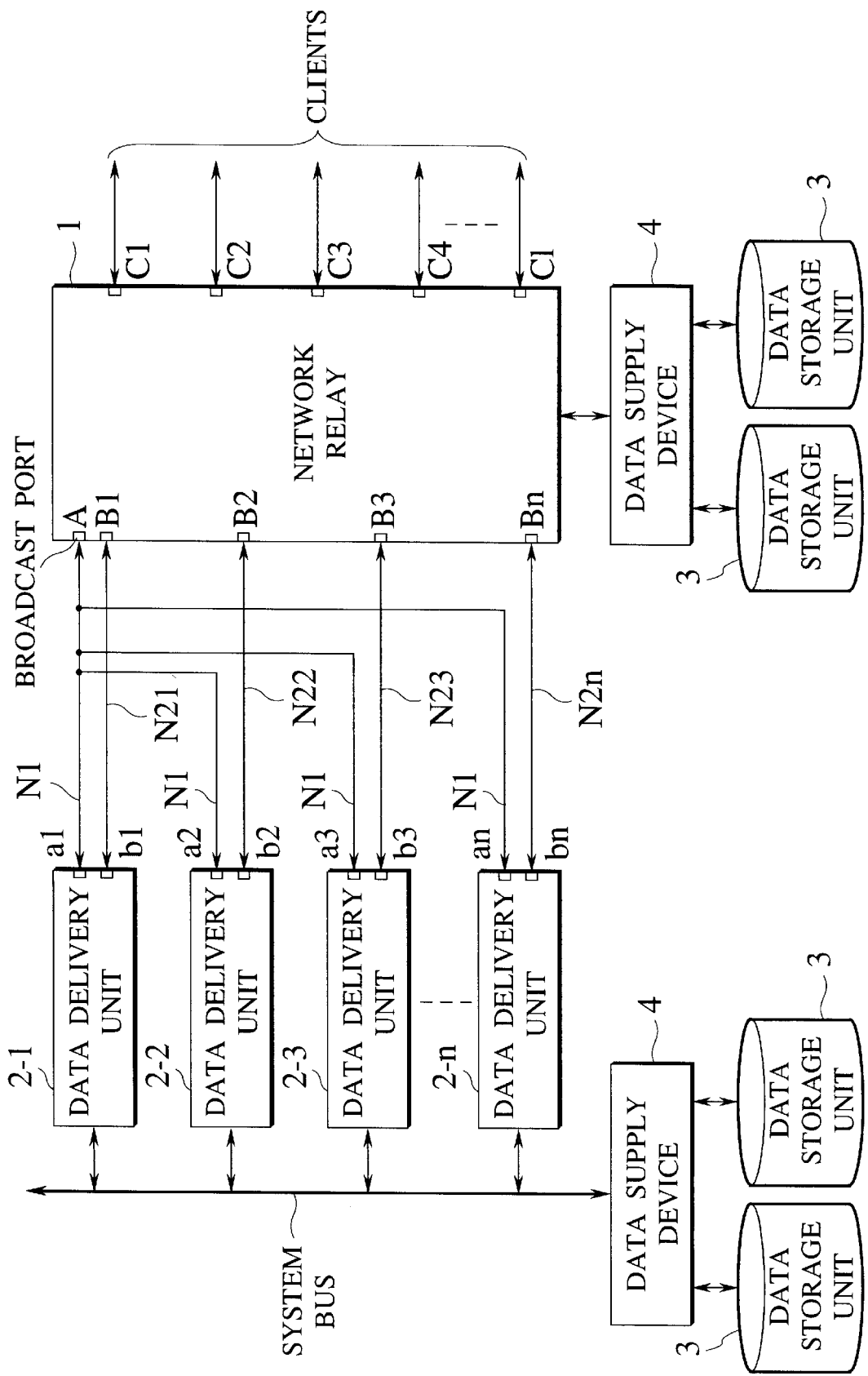
FIG. 1 is a block diagram showing an exemplary configuration of a data delivery system according to one embodiment of the present invention.

FIG. 1 shows a data delivery system according to this embodiment, which comprises a plurality of data delivery units 2-1, 2-2, . . . , 2-n (generically also referred to as data delivery units 2 hereafter) which are connected to a network delay 1, and a data supply device 4 for reading data stored in data storage units 3 according to commands from the data delivery units 2 and relaying data to the data delivery units 2. The network relay 1 is connected with one or a plurality of clients (now shown).

The network relay 1 is connected with the data delivery unit 2 in two ways. One is a path N1 which is connected to a port. "a" of every data delivery unit 2 and through which all traffics are delivered to all the data delivery units 2 arid the network relay 1. The other is paths N21, N22, . . . , N2n, each of which is connected only with one arbitrary port among ports of the network relay 1 and a port "b" of one data delivery unit 2.

The network relay 1 relays all transmission packets from a client j (not shown) destined to the data delivery units 2 to a port A of the network relay 1 such that each packet (request) from the client is relayed to all the data delivery units 2 (via the path N1). Also, each packet (response) from the data delivery unit 2 destined to the client is transmitted from a port bi of the data delivery unit 2-i (via the path N2i) to the port Bi of the network relay 1 as a general rule, with some exceptions (such as a response to an address resolution request described below), and the network relay 1 outputs the packet to a port Cj connected to the client j which is the destination of the packet.

The data supply device 4 can be connected to the data delivery units 2 either via a system bus or via the network relay 1. It is possible to provide one data supply device 4 connected via a system bus and another data supply device 4 connected via the network relay 1 as shown in FIG. 1, or only one of them may be provided. In the case of connecting the data supply device 4 via the network relay 1, it is also possible to provide the data supply device 4 at a remote location via other networks, and it is also possible to provide a plurality of such remote data supply devices.

Now, a procedure for supplying data requested by the client from the data storage units 3 and deliver data to the client will be described. In the example described below, it is assumed that a connection-oriented communication protocol such as TCP/IP is used in the data delivery procedure in order to realize a reliable data delivery.

When the client requests data, the client first transmits a connection request to the data delivery unit 2 in order to establish a connection with the data delivery unit 2. The connection request issued by the client j is transmitted to the network relay 1 through a network, and further transmitted to the ports a1, a2, . . . . , an of all the data delivery units 2 through the port A of the network relay 1. Then, one data delivery unit 2-i accepts the connection request and outputs a response to the connection request from the port bi to the port Bi of the network relay 1. When the response to the connection request is further transmitted from the network relay 1 to the client j, the connection is established. The data delivery unit 2-k (k≠i) that does not accept the connection request does not respond to this connection request at all. If the response to the connection request fails to be transmitted to the client, the client makes the connection request again after appropriate time interval.

After the connection is established, the client j notifies an information regarding a location of requested data (address of data such as URL, for example; which will also be referred to as a data delivery request) to the data delivery unit 2 by the same path N1 as for the earlier connection request. Upon receiving this information regarding a location of requested data, the data delivery unit 2-i which responded to the earlier connection request transmits a response indicating its reception by the same path N2i as used for the response to the connection request. The data delivery unit 2-k that did not respond to the earlier connection request also does not respond to this data delivery request at all either. If the response fails to be transmitted to the client, the client makes this data delivery request again after appropriate time interval.

The data delivery unit 2-i that is in the connection state with the client j analyzes the data location information received from the client j, and determines a data delivery unit 2-m to carry out the data delivery with respect to the client j. When the determined data delivery unit 2-m is different from the data delivery unit 2-i in the connection state, the data delivery unit 2-i transmits an information regarding the connection state and an information regarding data to be delivered to the determined data delivery unit 2-m (by any route in any way). Thereafter the data delivery unit 2-i completely transfers the processing regarding the connection with the client j and the data delivery processing to the data delivery unit 2-m, and does not make any response to the various requests from the client j.

Here, the information to be transferred to the data delivery unit 2 that is the data delivery processing transfer target contains a logical address indicating a device to be connected, a sequence number for the purpose of managing data transmission and reception order, and an identification code for the purpose of transferring a plurality of data simultaneously if necessary, for example.

At this point, the communication packets from the client j are transmitted to all the data delivery unit 2 from the port A of the network relay 1, so that even when the data delivery unit 2 for carrying out the data delivery processing is switched from 2-i to 2-m, there is no need for the client j and the network relay 1 to carry out any special processing such as changing packet transmission target port or newly establishing a connection with the switched data delivery unit 2.

Note also that, in this way, even when some data delivery unit 2 is disabled, it is still possible to continue the data delivery by transferring the data delivery processing, to the other operable data delivery unit 2. Even in such a case, the request transmission procedure at the client side is the same as in the normal case, so that the the effect of the disablement of some data delivery unit 2 can be completely concealed from the client side, so that it is possible to provide a superior measure again disablement.

The data delivery unit 2-m to which the data delivery processing with respect to the client j is transferred, or the data delivery unit 2-i when the determined data delivery unit 2 is the data delivery unit 2-i itself that is already in the connection state with the client j (in which case the data delivery unit 2-i is the same as the data delivery unit 2-m so that it will be referred to as the data delivery unit 2-m hereafter), then transmits an information regarding a location of necessary data to the data storage units 3 via the data supply device 4, and obtains necessary data from the data supply device 4.

The data delivery unit 2-m for carrying out the data delivery then transmits the obtained data from the port bm to the client j through the port Bm of the network relay 1 (via the path N2m). Upon receiving data, the client j transmits a response for it via the port A of the network relay 1 to all the data deliver units 2. Upon receiving this response, the data delivery unit 2-m for carrying out the data delivery updates the data delivery status and transmits the subsequent data when data are delivered properly, or carries out the data re-transmission processing otherwise.

When the data delivery is completed, the data delivery unit 2-m for carrying out the data delivery transmits a message for disconnecting the connection relationship with the client j to the client j, and the connection relationship is terminated upon receiving a response from the client j.

Next, a method for determining the data delivery unit 2 to respond to the connection request from the client will be described.

The connection request from the client can be responded by any data delivery unit 2. However, a plurality of data delivery unit 2 should not respond to the same connection request. For this reason, either one of the following methods can be adopted in order to have one and only one data delivery unit 2 for responding to the connection request.

(1) A method in which a predetermined data delivery unit 2 responds: In this case, a predetermined data delivery unit 2 always responds to all the connection requests and the other data delivery units 2 do not respond to the connection request at all. This case corresponds to a method of fixedly setting a response right to be described below.

(2) A method for defining a response right with respect to the connection request, which is to be sequentially transferred among the data delivery units 2: For example, at a time of system activation, the response right is given to one data delivery unit 2. This is done by erecting a flag indicating the presence of the response right in a memory or the like of that one data delivery unit 2, such that each data delivery unit 2 recognizes that it has the response right and respond to the connection request only when that flag is erected. After responding to one or arbitrary many connection requests, or after a prescribed period of time elapsed, one of the other data delivery units 2 is selected and the response right is transferred there. Namely, a message for giving the response right is notified to the selected data delivery unit 2 (by any route in any way), such that the data delivery unit 2 that received this message erects the flag indicating the presence of the response right while returning a confirmation message. When the confirmation message cannot be received, it is judged that the selected data delivery unit 2 is in the disabled state for some reason so that another data delivery unit 2 is selected and the response right is transferred there.

In the above method (2), the data delivery unit 2 which does not have the response right does not respond to the connection request at all. Also, as a method for selecting the data delivery unit 2 to which the response right is to be transferred next, it is possible to adopt a method for sequentially selecting each data delivery unit in an order of serial numbers assigned to the data delivery 2 units, or a method in which each data delivery unit 2 which is capable of responding reports its own state and one that satisfies a prescribed condition is selected among those capable of responding. Here, the prescribed condition can require the data delivery unit 2 with the least number of clients currently connected, the data delivery unit 2 with the least remaining amount of data to be transferred, or their combination, for example. In this method, the data delivery unit 2 that has been disabled will not be able to notify its own state to the other delivery units 2 so that it will never be given the response right after all.

Next, some exemplary methods for determining the data delivery unit 2 to carry out the data delivery will be described.

(I) A method for selecting the data delivery unit 2 which already has data to be delivered: When it is ascertained somehow (by communications among data delivery units 2, communications with the data supply device 4, etc.) that data to be delivered is already stored in a cache memory provided in one data delivery unit 2, that data delivery unit 2 is selected for carrying out the data delivery. By utilizing the cache memory in the data delivery unit 2, it is possible to reduce loads on the data supply device 4 (and the data storage units 3), while by distributing loads among the data delivery units 2, it becomes possible to simultaneously transfer data with respect to many clients in short time.

(II) A method for selecting the data delivery unit 2 by hashing: An address of data requested by the client is applied with a function for always returning the same output for the same input such as the hash function, and the data delivery unit 2 corresponding to that output value is selected for carrying out the data delivery. Examples of the hash function include a residue calculation with respect to the data address converted into a numerical value. In this way, the same effects as the above method (I) can be realized, and in addition, no communications among the data delivery units 2 or with the data supply device 4 are required so that the data delivery unit 2 to carry out the data delivery can be determined very quickly, and therefore the data delivery can be started more quickly. Note that when some data delivery unit 2 is found to be not operating properly because of the disablement or other cause, it suffices to redefine the correspondence between the hash values and the data delivery units 2 at that point. In this way, the disabled data delivery unit 2 will not be used so, that it is possible to continue the data delivery without stopping the system.

(III) A method for selecting the data delivery unit 2 according to the load on the data delivery unit 2: The data delivery unit 2 with the lowest load (the least number of clients that are simultaneously connected, for example) among the data delivery units 2 is selected for carrying out the data delivery. Else, when the data delivery unit 2 determined by the above method (I) or (II) is found to have heavy loads concentrated on it, the data delivery unit 2 with a load lower than a prescribed value is re-selected. By distributing loads among the data delivery unit 2 in this way, it becomes possible to simultaneously transfer data with respect to many clients in short time.

Figure 2:
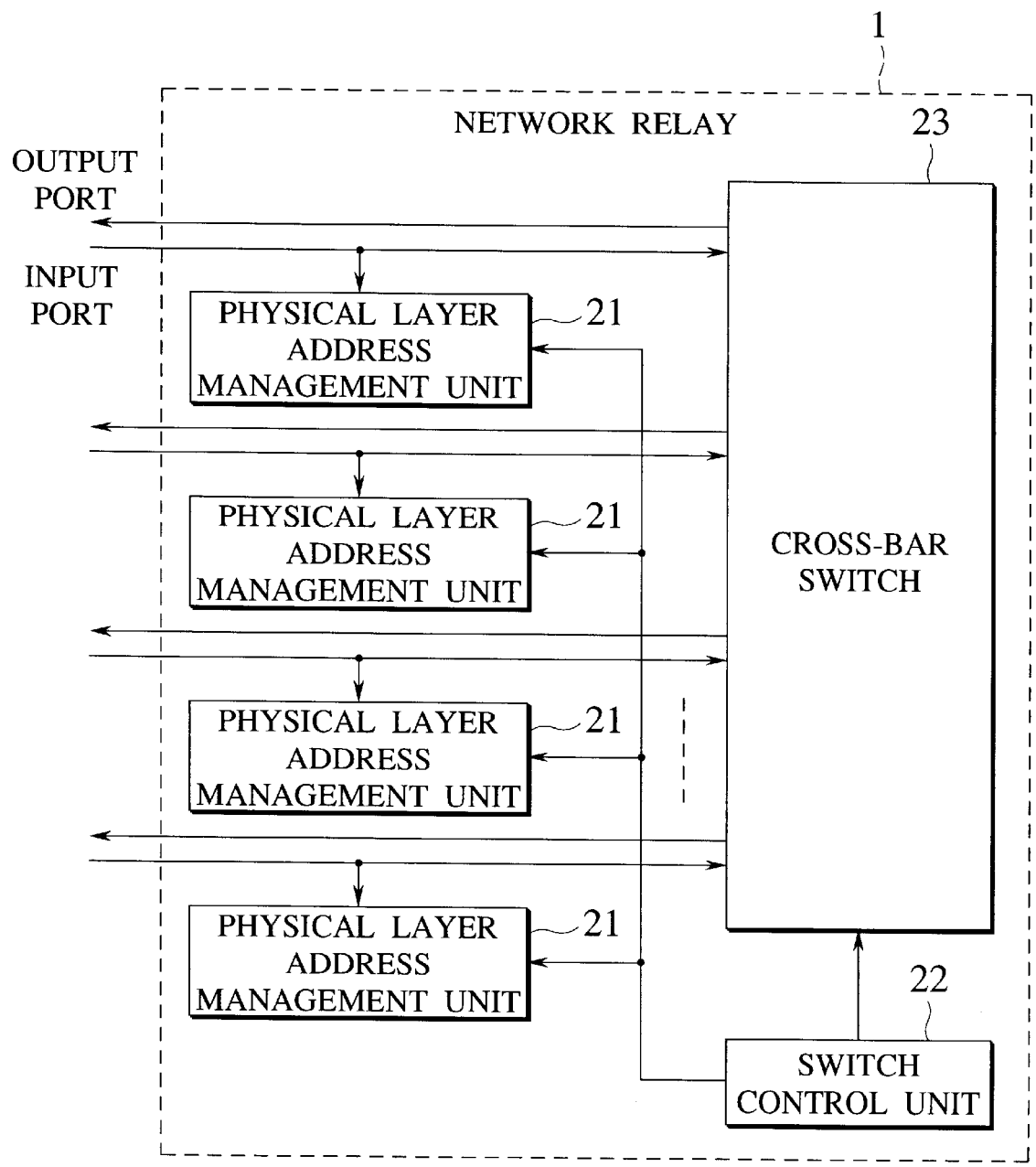
FIG. 2 is a block diagram showing an exemplary configuration of a network relay in the data delivery system of FIG. 1.

Next, a configuration for using the so called Ethernet switch with learning function for the network relay 1 will be described. The Ethernet switch with learning function has an exemplary configuration as shown in FIG. 2.

A physical layer address management unit 21 connected to each port extracts and stores a physical layer address of a source contained in each communication data packet entered from the data delivery unit 2 of FIG. 1 or the client. In addition, the physical layer address management unit 21 judges whether the same physical layer address exists at the physical layer address management unit 21 of the other port or not, and discards the older one of them if it is judged to exist.

When a packet is entered at some port from the data delivery unit 2 or the client, a switch control unit 22 extracts a destination physical layer address indicated inside that packet, and identifies the physical layer address management unit 21 which stores the same physical layer address as the extracted physical layer address, and controls a cross-bar switch 23 such that the entered packet is outputted to a port to which the identified physical layer address management unit 21 is connected. Note that when the destination physical layer address indicates the broadcast, the packet will be outputted to all the ports except for the port used in entering the packet. Also, when no physical layer address management unit 21 stores the same physical layer address as the extracted destination physical layer address, that packet will be discarded. Also, when there are a plurality of packets to be outputted to one output port simultaneously, the buffering is carried out.

In the ordinary one-to-one communications between the client and the data delivery unit 2, the source MAC address to be used is that of the client itself on the client side and that of the port "b" of the data delivery unit 2 (with the unique lower layer address) on the data delivery unit side. However, in the communications using ARP (Address Resolution Protocol) to be described below, the data delivery unit side uses the MAC address of the port "a" of the data delivery unit 2 (with the common lower layer address). By storing these source MAC addresses, the Ethernet switch with learning function learns the MAC address of a device connected to each port (such as that the client j is connected to the port Cj, for example).

In order to learn that the port "a" of the data delivery unit 2 is, connected to the port A of the network relay 1, the following two methods are available for example. Here, it is assumed that the same MAC address (with the common lower layer address) is assigned to the ports a1, a2 . . . , an of all the data delivery units 2, and this common MAC address is to be used at a time of packet transmission from the port "a" of every data delivery unit 2.

One method is that the Ethernet switch learns this as all or a part of the data delivery units 2 regularly output some packet (dummy data) from the port "a".

Another method is to utilize the ARP that is used in obtaining the MAC address of the correspondent which is necessary in order to carry out communications by TCP/IP on Ethernet. In the ARP, either: (1) an ARP request containing an IP address of the correspondent (the present data delivery system from a viewpoint of the client) is broadcast in the network; or (2) a network device (one of the data delivery units 2 within the data delivery system in this example) which has the corresponding IP address returns the own MAC address as an ARP response.

The ARP is carried out regularly when the client starts making connection to the data delivery system for the first time or after a prescribed period of time elapsed since the MAC address was obtained. By making a response to this from the port, "a" of the data delivery unit 2, the Ethernet switch can learn that the port "a" of the data delivery unit 2 is connected to the port A.

It is also possible to realize the learning by the Ethernet switch such that packets from all the clients are transferred to a path to which the port "a" of the every data delivery units 2 is connected through the port A of the network relay 1, by outputting a response to the client from the port "a", in correspondence to the common MAC address of the port "a", in response to the ARP requests for all IP addresses that are handled by the data delivery system.

Figure 3:
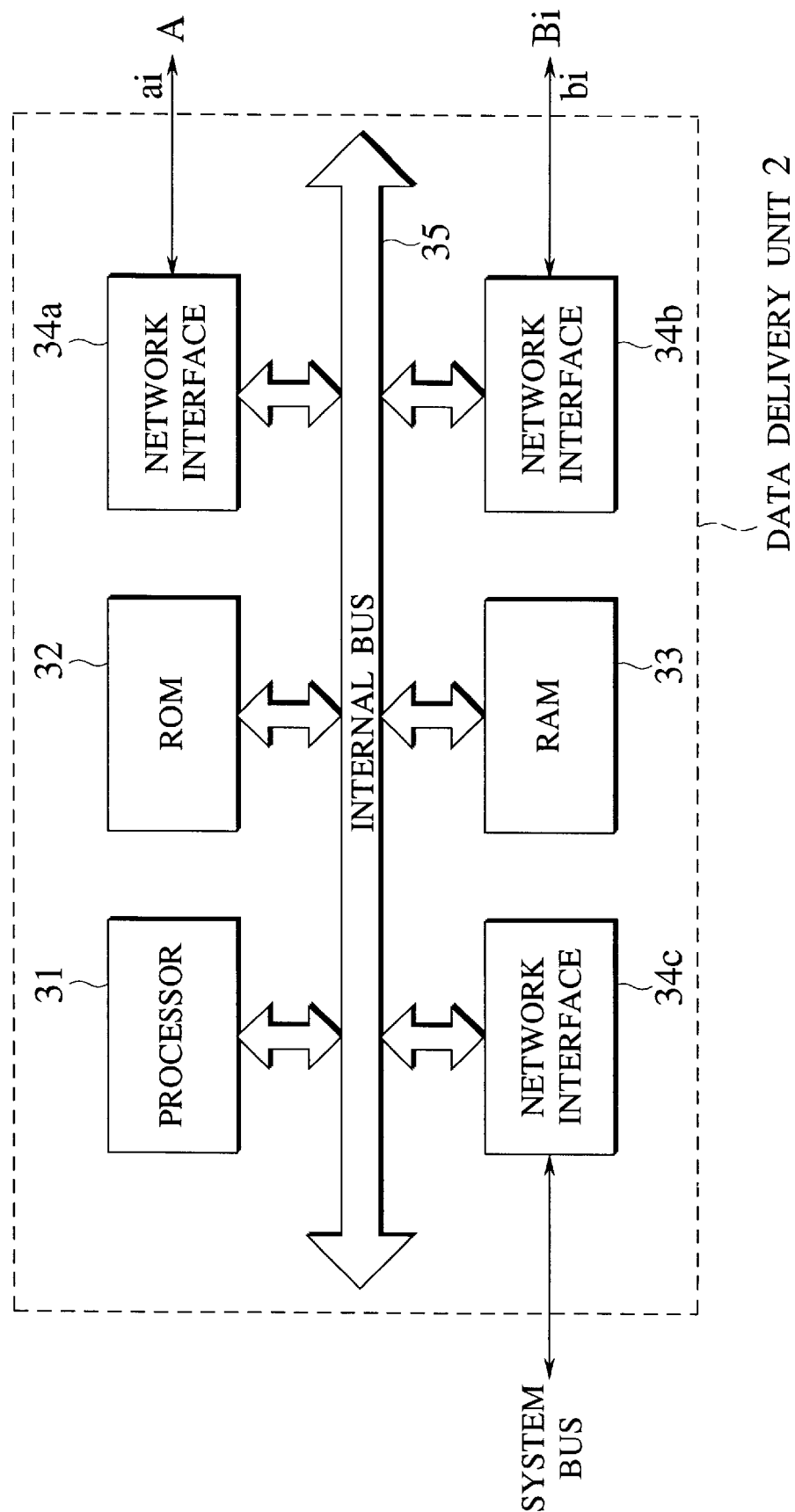
FIG. 3 is a block diagram showing an exemplary configuration of a data delivery unit in the data delivery system of FIG. 1.

Next, with reference to FIG. 3, an exemplary hardware configuration of the data delivery unit 2 will be described. The data delivery unit 2 typically comprises a processor 31, a ROM 32, a RAM 33, and network interfaces 34a, 34b and 34c, which are all connected by an internal bus 35.

The processor 31 executes the processing described below while controlling the RAM 33 and the network interfaces 34a, 34b and 34c according to a program stored in the ROM 32.

The network interface 34a is allocated with a physical layer address common to the network interface 34a of the other data delivery units 2 (shared MAC address), as well as with a logical address of the present data delivery system (an IP address (IP-C) shared by the other data delivery units 2). The network interface 34a is connected to a broadcast port A of the network relay 1 such that all the data delivery units 2 receive packets from the port A of the network relay 1.

The network interface 34b is allocated with a unique physical layer address of each data delivery unit 2 (unique MAC address). A unique logical address may also be allocated if necessary. The communications between the network interface 34b and the corresponding port B of the network relay 1 are carried out by unicast.

The network interface 34c is allocated with a unique physical layer address, as well as with a unique logical address if necessary, and connected with a system bus connected to the data supply device 4 of FIG. 1.

Now, the operation of the present data delivery system will be described with reference to FIG. 4.

In this embodiment, the client establishes a correspondence between the physical layer address and the logical address for the shared logical address IP-C. To this end, the client broadcasts an APR request for the shared logical address IP-C in the network (step 41). When this ARP request is received, the network relay 1 detects a physical layer address of the source (client) which is contained in this request message, and learns the correspondence with the port Cj to which this client j is connected. Then, the network relay 1 transfers that request message by broadcast to the ports other than that from which the request message is received (step 42).

All the data delivery units 2 receive this request message through the network interface 34a, and the data delivery unit 2-i which has the response right among them transmits a shared physical layer address MAC-C corresponding to the shared logical address IP-C as an ARP response through the network interface 34a (step 43). This response message is then transmitted to the client through the port A and the port Cj of the network relay 1. Here, the response right may be initially given to a predetermined one data delivery unit 2-i and sequentially transferred to a next data delivery unit 2-(i+1).

In this way, the network relay 1 recognizes that a device (data delivery unit 2) having the shared physical layer address MAC-C is connected to the broadcast port A, and learns this. Also, the client can learn the physical layer address (MAC-C) of the correspondent so that unicast communications with the correspondence become possible thereafter.

When the ARP response is received, the client transmits a connection request with the shared logical address IP-C as a connection target and the obtained shared physical layer address MAC-C as a destination to the network (step 44). The network relay 1 then transfers that connection request from the broadcast port A via the path N1 according to the result of the earlier learning (step 45).

The network interface 34a of each data delivery unit 2 receives this connection request, and the data delivery unit 2-i that has the response right transmits a connection request response from the network interface 34b in response to this connection request (step 46). Here, the shared logical address (IP-C) is used for the source logical address of this connection request response, while the MAC address uniquely allocated to the network interface 34b of the data delivery unit 2-i that has the response right is used for the source physical layer address. The network relay 1 may also recognize the unique MAC address of the data delivery unit 2-i at a time of transferring this connection request response to the client.

When the connection request response is transmitted from the data delivery unit 2-i to the client, the connection processing is completed, and after the connection is established in this way the data delivery is carried out by the following route. Namely, the data delivery request from the client is transferred by the route reaching to the network interface 34a of all the data delivery units 2 through the port A of the network relay 1, while data from one data delivery unit 2-i that respond to this data delivery request is delivered to the client by the route from the network interface 34b of the data delivery unit 2-i through the port Bi of the network relay 1. The data delivery unit 2-i obtains data to be delivered to the client either from the own cache memory or from the data supply device 4 through the network interface 34c. By providing a plurality of network interfaces 34b and outputting data distributedly in this way, it becomes possible to improve the output performance of the data delivery system.

The present data delivery system can be formed in a configuration as shown in FIG. 5. Namely, it is possible to replace the network relay 1 of FIG. 1 by a simple broadcast type network such as HUB. In this case, the data delivery units 2 does not have to be provided with the network interface 34b, and all the responses to the client are transmitted through the network interface 34a (even in the operation corresponding to the step 46 of FIG. 4). Also, the steps 42 and 44 in the procedure of FIG. 4 can be omitted. Note however that, in the configuration of FIG. 5, there is a higher probability for having packet communications of the data delivery units 2 collide each other, so that the load distribution effect of the present invention becomes apparent when the data supply performance of the data delivery units 2 is lower than the bandwidth of the network.

Also, the data delivery unit 2 can be given in a configuration shown in FIG. 6, which includes a cache memory device 36 already described above, in addition to the configuration of FIG. 3. As described above, this cache memory device 36 is effective in the case of determining the data delivery unit 2 to carry out the data delivery such that data will be transmitted from the same data delivery unit 2 whenever the address information of data contained in the data delivery request is the same.

For example, when data to be delivered in response to the data delivery request from the client is supplied from the data supply device 4, this data is cached in the cache memory device 36 while it is transmitted from the network interface. Else, if data addresses to be handled by each data delivery unit 2 are assigned in advance, data of these addresses may be prefetched and cached in the cache memory device 36. After these data are temporarily cached in the cache memory device 36, if data specified by the data delivery request from the client is present in the cache memory device 36, the cached data in the cache memory device 36 is transmitted to the client without issuing a data supply command to the data supply device 4.

In this way, the specific data delivery unit 2 will be temporarily holding the specific data according to the data address information, so that data can be cached efficiently in a mutually exclusive way among the data delivery units 2. Consequently, it becomes possible to reduce the number of accesses to the data supply device 4 and thereby realize a high speed operation.

In order to maintain the consistency between data stored in the data storage units 3 connected to the data supply device 4 and data cached in the cache memory device 36 of the data delivery unit 2, it is possible to adopt a scheme in which a valid period is given to data and the data delivery unit 2 inquires whether data has been updated or not to the data supply device 4 whenever it is judged that the valid period of data has expired, or a scheme in which the data delivery unit 2 makes that inquiry at appropriate timing and sets up a next time for the inquiry when data has not been updated. Also, when it is necessary to delete data stored in the cache memory device 36, the cached data can be deleted by the LRU algorithm or the like that is used in the ordinary cache.

Note here that, in general, the response right includes: (1) a response right with respect to a connection request, and (2) a response right with respect to a data delivery request. When one data delivery unit 2 commands another data delivery unit 2 to transmit the response containing data requested by the data delivery request, this one data delivery unit 2 may transfer the response right (2) to that another data delivery unit 2 while retaining the response right (1) at this one data delivery unit 2, or this one data delivery unit 2 may transfer both the response right (1) and the response right (2) to that another data delivery unit 2.

Note also that, in general, the data delivery unit 2 which returns a response indicating the receipt of the data delivery request can be different from the data delivery unit 2 which delivers data requested by the data delivery request.

As described, according to the present invention, a request from the client to the present data delivery system is always received by all the data delivery units according to the shared lower layer address (such as a physical layer address (MAC address, for example)), while a response to the connection request is made by only one data delivery unit which has the response right at that moment (using the unique lower layer address of that data delivery unit). In this way, it appears to the client as if the request is always made with respect to the same correspondent (the upper layer address (such as a logical address (IP address, for example)) of the present data delivery system), while at the data supply side, the data delivery unit for responding to the client is appropriately switched by appropriately transferring the response right so as to realize the load distribution within the present data delivery system.

Also, when the received request is the address resolution request, a response having the upper layer address as a source is transmitted using the shared lower layer address. The address resolution request inquires the lower layer address of a device which has the specified upper layer address, but in the present invention, the data delivery unit which received this request returns the shared lower layer address (one that commonly used by the entire data delivery system) rather than the own unique lower layer address. This response may be made by the data delivery unit which has the response right. In this way, the client only recognizes the shared lower layer address so that it appears to the client as if the present data delivery system is always the same correspondent in terms of the lower layer.

Thus according to the present invention, the client can transmit requests always with respect to the same correspondence (data delivery system), just like the client of the conventional system, while the data delivery system can be provided with a plurality of units for delivering data to the clients and appropriately switch these units.

Note that, before the connection is established, which data at which address is going to be requested by the data delivery request is still uncertain, so that it is impossible to select an optimum data delivery unit (that has the requested data as cached data, for example) so as to realize the load distribution at that point. However, in the present invention, the data delivery unit that should delivery the requested data is selected according to the data delivery request after the connection is established (i.e., a state in which the response to the connection request is returned), and this is done in the present invention without requiring any special processing on the client side such as re-direction.

It is to be noted that the above described embodiment according to the present invention may be conveniently implemented in forms of software programs for realizing the operations of the communication control system, as will be apparent to those skilled in the computer art. Appropriate software coding can readily be prepared by skilled programmers based on the teachings of the present disclosure, as will be apparent to those skilled in the software art.

In particular, each data delivery unit of the above embodiment can be conveniently implemented in a form of a software package such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMS, EEPROMs, magnetic or optical cards, or any other suitable media for storing electronic instructions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A data delivery system for delivering data to clients, the system having an upper layer address allocated thereto and comprising:

a plurality of data delivery units, each having a shared lower layer address common to said plurality of data delivery units and a unique lower layer address uniquely allocated to each data delivery unit; and a transfer unit for transferring a request destined to the upper layer address and transmitted from a client to said plurality of data delivery units and transferring a response destined to the client and transmitted from one of said plurality of data delivery units toward the client;

wherein each data delivery unit includes a reception unit for receiving a request from the client that is transferred to the shared lower layer address, and a transmission unit for transmitting a response which has the upper layer address as a source by using own unique lower layer address when a request received by the reception unit is a connection request that is made prior to data delivery and said each data delivery unit has a response right indicating one of said plurality of data delivery units which is allowed to respond to requests.

2. The system of claim 1, wherein the transmission unit of each data delivery unit transmits a response which has the upper layer address as a source by using the shared lower layer address when a request received by the reception unit is an address resolution request.

3. The system of claim 1, wherein the transmission unit of each data delivery unit transmits a response which has the upper layer address as a source by using own unique lower layer address when a request received by the reception unit is a data delivery request and said each data delivery unit has the response right.

4. The system of claim 1, wherein the system further comprises a shared memory for storing data which is to be shared by said plurality of data delivery units;

each data delivery unit further includes a cache memory for temporarily storing data; and the transmission unit of each data delivery unit reads out specific data requested by a data delivery request from the cache memory if the specific data exists in the cache memory, or reads out the specific data from the shared memory if the specific data does not exist in the cache memory, and transmits a response containing the specific data and having the upper layer address as a source by using own unique lower layer address, according to a data delivery request that is transferred from the client to the shared lower layer address.

5. The system of claim 1, wherein each data delivery unit further includes a command unit for sending a command commanding one data delivery unit other than said each data delivery unit to transmit specific data requested by a data delivery request when a request received by the reception unit is a data delivery request and said each data delivery unit has the response right; and the transmission unit of each data delivery unit transmits a response containing the specific data and having the upper layer address by using own unique lower layer address, according to a data delivery request that is transferred from the client to the shared lower layer address, upon receiving the command from another data delivery unit.

6. The system of claim 5, wherein each data delivery unit further includes a processor for determining said one data delivery unit which should transmit the specific data requested by a data delivery request, according to a prescribed information contained in a data delivery request received by the reception unit.

7. The system of claim 5, wherein each data delivery unit notifies information regarding a connection state and information regarding data to be delivered at a time of sending the command to said one data delivery unit.

8. The system of claim 1, wherein the transfer unit includes:

a memory for storing correspondences between a source lower layer address of each message received at the transfer unit and a port through which each message is received; and a transfer processing unit for transferring a message destined to the shared lower layer address which is received from a first port connected to the client to a second port connected to said plurality of data delivery units, and transferring a message destined to the client which is received from a third port connected to one of said plurality of data delivery units to the first port, according to the correspondences stored in the memory.

9. A method for delivering data to clients from a system formed by a plurality of data delivery units, comprising the steps of:

allocating a common upper layer address to said plurality of data delivery units;

allocating to each data delivery unit a shared lower layer address common to said plurality of data delivery units and a unique lower layer address to be uniquely allocated to each data delivery unit;

transferring a request destined to the upper layer address and transmitted from a client to said plurality of data delivery units;

receiving at each data delivery unit a request from the client that is transferred to the shared lower layer address;

transmitting from one data delivery unit which has a response right indicating one of said plurality of data delivery units which is allowed to respond to a request, a response which has the upper layer address as a source by using own unique lower layer address when a request received by the receiving step is a connection request that is made prior to data delivery; and transferring a response destined to the client and transmitted from one of said plurality of data delivery units toward the client.

10. A data delivery device among a plurality of data delivery devices for delivering data to clients in cooperation, comprising:

a memory for storing an upper layer address which is commonly allocated to said plurality of data delivery devices;

a first interface for holding a shared lower layer address commonly allocated to said plurality of data delivery devices, receiving a request destined to the upper layer address and transmitted from a client, and transmitting a response which has the upper layer address as a source by using the shared lower layer address when a received request is an address resolution request; and a second interface for holding a unique lower layer address uniquely allocated to said data delivery device among said plurality of data delivery devices, and transmitting a response which has the upper layer address as a source by using own unique lower layer address when a received request is a connection request that is made prior to data delivery and said data delivery device has a response right indicating one of said plurality of data delivery devices which is allowed to respond to requests.

11. An article of manufacture, comprising:

a computer usable medium having computer readable program code means embodied therein for causing a computer to function as a data delivery device among a plurality of data delivery devices for delivering data to clients in cooperation, the computer readable program code means includes:

first computer readable program code means for causing said computer to store an upper layer address which is commonly allocated to said plurality of data delivery devices:

second computer readable program code means for causing said computer to hold a shared lower layer address commonly allocated to said plurality of data delivery devices, receive a request destined to the upper layer address and transmitted from a client, and transmit a response which has the upper layer address as a source by using the shared lower layer address when a received request is an address resolution request; and third computer readable program code means for causing said computer to hold a unique lower layer address uniquely allocated to said data delivery device among said plurality of data delivery devices, and transmit a response which has the upper layer address as a source by using own unique lower layer address when a received request is a connection request that is made prior to data delivery and said data delivery device has a response right indicating one of said plurality of data delivery devices which is allowed to respond to requests.

12. A data delivery system for delivering data to clients, comprising:

a plurality of data delivery units, in which requests transmitted from a client including a connection request and a data delivery request are received by every data delivery unit and responses to requests are transmitted from one of said plurality of data delivery units toward the client, each data delivery unit including:

a transmission unit capable of transmitting a first response to the connection request and a second response containing data requested by the data delivery request; and a processor for determining one data delivery unit which should transmit the second response among said plurality of data delivery units and commanding said one data delivery unit to transmit the second response, in a case where the transmission unit of said each data delivery unit transmitted the first response.

13. The system of claim 12, wherein the transmission unit of each data delivery unit transmits the first response when said each data delivery unit has a response right indicating one of said plurality of data delivery units which is allowed to respond to a request received from the client, and the processor of each data delivery unit transfers at least a part of the response right including a right to transmit the second response to said one data delivery unit when said one data delivery unit is different from said each data delivery unit.

14. The system of claim 12, wherein the processor of each data delivery unit determines said one data delivery unit which already has data requested by the data delivery request as a cached data.

15. The system of claim 12, wherein the processor of each data delivery unit determines said one data delivery unit according to an address of data requested by the data delivery request.

16. The system of claim 12, wherein the processor of each data delivery unit determines said one data delivery unit which has a lowest processing load among said plurality of data delivery units.

17. A method for delivering data to clients from a system formed by a plurality of data delivery units, the method comprising the steps of:

receiving requests transmitted from a client including a connection request and a data delivery request by every data delivery unit;

transmitting responses to requests from one of said plurality of data delivery units toward the client, where each data delivery unit is capable of transmitting a first response to the connection request and a second response containing data requested by the data delivery request; and determining one data delivery unit which should transmit the second response among said plurality of data delivery units and commanding said one data delivery unit to transmit the second response, at each data delivery unit which transmitted the first response.

18. A data delivery device among a plurality of data delivery devices for delivering data to clients in cooperation, comprising:

a reception unit for receiving requests transmitted from a client including a connection request and a data delivery request which are to be received by every data delivery devices;

a transmission unit capable of transmitting a first response to the connection request and a second response containing data requested by the data delivery request, where responses to requests are to be transmitted from one of said plurality of data delivery devices toward the client; and a processor for determining one data delivery device which should transmit the second response among said plurality of data delivery devices and commanding said one data delivery unit to transmit the second response, in a case where the transmission unit of said data delivery device transmitted the first response.

19. An article of manufacture, comprising:

a computer usable medium having computer readable program code means embodied therein for causing a computer to function as a data delivery device among a plurality of data delivery devices for delivering data to clients in cooperation, the computer readable program code means includes:

first computer readable program code means for causing said computer to receive requests transmitted from a client including a connection request and a data delivery request which are to be received by every data delivery devices;

second computer readable program code means for causing said computer to function as a transmission unit of said data delivery device which is capable of transmitting a first response to the connection request and a second response containing data requested by the data delivery request, where responses to requests are to be transmitted from one of said plurality of data delivery devices toward the client; and third computer readable program code means for causing said computer to determine one data delivery device which should transmit the second response among said plurality of data delivery devices and command said one data delivery unit to transmit the second response, in a case where the transmission unit of said data delivery device transmitted the first response.

\* \* \* \* \*